United States Patent [19]
McCauley et al.

[11] Patent Number: 5,386,560
[45] Date of Patent: Jan. 31, 1995

[54] EXECUTION OF PAGE DATA TRANSFER BY PT PROCESSORS AND ISSUING OF SPLIT START AND TEST INSTRUCTIONS BY CPUS COORDINATED BY QUEUED TOKENS

[75] Inventors: Donald W. McCauley, Pleasant Valley; Richard J. Schmalz; Ronald M. Smith, Sr., both of Wappingers Falls; Susan B. Stillman, Poughkeepsie, all of N.Y.

[73] Assignee: International Business Machines Corporation, Armonk, N.Y.

[21] Appl. No.: 704,559

[22] Filed: May 23, 1991

[51] Int. Cl.⁶ ............................................. G06F 13/14
[52] U.S. Cl. .................... 395/650; 364/230; 364/281.3; 364/247.2; 364/DIG. 1; 395/275; 395/425; 395/725
[58] Field of Search .................. 395/275, 425, 650, 725

[56] References Cited

U.S. PATENT DOCUMENTS

| | | | |
|---|---|---|---|
| 3,623,022 | 11/1971 | Day | 395/325 |
| 3,725,864 | 4/1973 | Clark et al. | 395/275 |
| 4,177,513 | 12/1979 | Hoffman et al. | 395/650 |
| 4,224,667 | 9/1980 | Lewis et al. | 395/275 |
| 4,374,409 | 2/1983 | Bienvenu et al. | 395/650 |
| 4,400,773 | 8/1983 | Brown et al. | 395/275 |
| 4,414,626 | 11/1983 | Arai et al. | 395/275 |
| 4,888,691 | 12/1989 | George et al. | 395/700 |

Primary Examiner—Kenneth S. Kim
Attorney, Agent, or Firm—Bernard M. Goldman

[57] ABSTRACT

Asynchronously transfers blocks of data (called pages) between two different electronic media of a data processing system. The different media may be a system main storage and a system expanded storage or a non-volatile external type of storage, either of which use different addressing than the main storage. All of these storages may be made of DRAM or SRAM technology with battery backup when necessary. The invention splits the involvement of a program requesting a page transfer into a pair of instructions per page transfer executing on one or more central processors. The first instruction of a pair starts another processor that controls the asynchronous page transfer, and the second instruction of the pair enables the communication of the end of the page transfer to the program. Neither instruction in the pair interrupts the program for the page transfer. A processor executing the starting instruction is immediately free to execute any other available instructions. Although both instructions in a pair may be executed by one processor, the pair may be executed by separate processors. And the execution of other instructions may overlap the page transfer between the execution of the pair.

15 Claims, 10 Drawing Sheets

FIG. 8

CP ACCESSIBLE LOCATION

| ADDRESS OF NEXT ELEMENT IN "AVAILABLE" STATE | ~11 |

| TOKEN | STATE | OP | MS PFA | ES BN | H/G | LPAR # | — QE-0 |

⋮

|  | — QE-k |

| ADDRESS OF NEXT ELEMENT IN "ACTIVE NOT-IN-PROC" STATE | ~12 |

PT PROCESSOR ACCESSIBLE LOCATION

EXECUTION OF PAGE DATA TRANSFER BY PT PROCESSORS AND ISSUING OF SPLIT START AND TEST INSTRUCTIONS BY CPUS COORDINATED BY QUEUED TOKENS

INTRODUCTION

The invention relates to the transfer of blocks of data (called pages) between two different media in a data processing system. The different media may be a system main storage and a system expanded storage which use different addressing, and each may be made of DRAM or SRAM technology. The invention splits the involvement of a program requesting a page transfer into a pair of instructions per page transfer. The first instruction of a pair starts an asynchronous processor that controls the page transfer, and the second instruction of the pair communicates the end of the page transfer to the program. Neither instruction in the pair interrupts the program requesting the page transfer. A processor executing the starting instruction is thereafter free to execute any other available instructions. Although both instructions in a pair may be executed by one processor, the processor may only execute the first instruction and then pass control to another processor to execute the second instruction of the pair (and of any instructions between the pair).

BACKGROUND

The prior art includes PAGEIN/PAGEOUT instructions disclosed and claimed in U.S. Pat. No. 4,476,524 in which a first embodiment discloses a synchronous means for controlling a page transfer between a system main storage (MS) and a physically-separate extended or expanded storage (ES). A second embodiment uses the IBM S/360 Start Input Output (SIO) instruction to invoke an I/O channel program containing one or more PAGEIN/PAGEOUT channel command words (CCWs) to control an asynchronous page transfer between the main storage and the expanded store. The asynchronous embodiment uses an I/O channel-end interruption at the end of the channel program execution to signal the end of each group of page transfers. This interrupted the program on processor selected to execute an I/O interrupt handler program in the operating system to perform I/O interruption services to handle the completion of each group of page transfers. Upon the completion of the interruption handler execution it passed control back to the processor which was interrupted. The result was that the processor which was interrupted due to the asynchronous PAGEIN or PAGEOUT instruction had its efficiency reduced by being diverted to another program (the interrupt handler) during which the processor was not available to execute its primary program.

A synchronous page transfer instruction requires its issuing processor to control all aspects of a page transfer from its initiation until its completion, and does not use any other processor. Unlike an asynchronous page transfer, a synchronous page transfer does not allow its processor to execute any other instructions during the page transfer. A synchronous page transfer instruction does not have any end-of-transfer interruption with its resulting interrupt handler intervention and overhead. The commercial implementations of the PAGEIN/PAGEOUT and MovePage (MVPG) instructions have provided only synchronous page move operations.

The synchronous PAGEIN/PAGEOUT instructions are IBM S/370 supervisory state instructions which use absolute addressing of storage. Often page transfers are used by operating system (OS) software (operating in supervisory state transparent to problem state application programs) to setup problem state programs for execution in MS or to store away execution results of problem state programs in ES.

The prior art of the MovePage (MVPG) instruction is disclosed and claimed in U.S. application Ser. No. 07/424,797 filed Oct. 29, 1989 entitled "Process Using Virtual Addressing in a Non-privileged Instruction to Control the Copying of a Page of Data in or between Multiple Media". The MVPG instruction operates synchronously with its program.

European patent 0 214 670 to Fujitsu discloses synchronous page transfer instructions which have operands dedicated to respective media.

SUMMARY OF THE INVENTION

The invention provides a basic improvement in system efficiency for an asynchronous page transfer between different media, e.g. ES (expanded storage) and MS (main storage). The invention eliminates the need for an end-of-transfer program interruption for controlling asynchronous page transfers. Accordingly, the invention eliminates the need for interruption handler program intervention at the end of each successful page transfer, while allowing the initiating processor to execute other CPU instructions that overlap a page transfer. The avoidance of program interruption eliminates costly operating system overhead, since the eliminated interrupt handler processing slows the program function served by the page transfer.

Consequently, the invention differs from all asynchronous page transfer facilities known in the prior art, which require interruption signalling and control program intervention at the end of each successful transfer of one or more pages.

The invention provides new instructions, which may be called: Start PageIn (SPIN), Start PageOut (SPOUT) and a Test Asynchronous Paging Status (TAPS). The SPIN or the SPOUT instruction controls the start (or initiation) of an asynchronous page copy (or move) operation between two media in respectively opposite directions by invoking a page transfer (PT) processor external of the processor issuing the SPIN/SPOUT instruction. The detailed control of the requested page transfer is done by the PT processor, which may be part of the ES controller hardware.

The TAPS instruction execution tests for the completion status of the requested page transfer. The TAPS instruction is issued and executed for the PT requesting program after the page transfer is estimated to have been completed. TAPS may be issued independent of the actual time of the page transfer completion at a time convenient to the issuing program. TAPS allows its issuing program to determine for itself under its own time constraints when it will test for the availability of the transferred pages in a specified location, and up to that time its processor may be executing any other available instructions. A condition code (CC) is provided for the TAPS instruction execution to report the current status of the page transfer, which the requesting program can then use to control its next operation without any program interruption occurring.

None of the SPIN, SPOUT or TAPS instructions is dependent on knowledge of the precise time of the completion for the requested page transfer. The most efficient use of the TAPS instruction is when its program waits until it needs to know the status of a requested page transfer before issuing the TAPS instruction (to determine if the page is available). The processor executing the TAPS instruction may execute other instructions until issuance of the TAPS instruction. There are two types of TAPS instruction which can have different affects upon the efficiency of its use. One type of TAPS instruction ends execution as soon as it tests the current status of the page transfer; and when the test indicates the page transfer has not completed, its processor can immediately return to executing other instructions. The other type of TAPS instruction continuously tests the current status of the page transfer until the page transfer has completed before it ends its execution, so that its processor can not execute other instructions during this wait time from the issuance of TAPS until the end of the page transfer. This controlled wait eliminated the need for programming any loop to perform waiting.

The invention splits into two parts the involvement of a program requiring a page transfer. One part involves the program to start a page transfer (by the issuance of a SPIN or SPOUT instruction), and the other part involves the program around at the end of the page transfer (by the issuance of a TAPS instruction). And in between these two split parts its processor may execute any available instructions (which may or may not be related to the page transfer program). The page transfer asynchronously overlaps the execution of these other instructions, since the page transfer details are being handled by a different processor (or controller) than the PT requesting processor.

An additional unobvious aspect of the invention is that it can eliminate (or greatly reduce) the exception handling for its instructions by subrogating its exception handling requirements to the existing synchronous PAGEIN and PAGEOUT instructions. If any exception (or error) is encountered in response to a SPIN/SPOUT instruction, the invention invalidates any further operation for the instruction. A subsequent TAPS instruction issued by the program would provide a condition code indicating a failure of the preceding SPIN/SPOUT instruction's execution. Then the program containing these instructions can invoke the synchronous PAGEIN/PAGE OUT instruction to perform the failed page transfer. The PAGEIN/PAGEOUT exception handling controls are then relied on to handle the exception (or error) condition.

Another advantage is that the split instructions of this invention may be issued by its program on different central processors. Thus, a program may issue the SPIN or SPOUT instruction on one CPU and later issue the TAPS instruction on another CPU, such as the program being dispatched on one CPU during a first time slice when it issues a SPIN or SPOUT instruction, and being later dispatched on a different CPU during a second time slice when it issues the TAPS instruction.

The SPIN, SPOUT and TAPS instruction of this invention are preferably provided as supervisory state instructions when they are structured to use real or absolute addressing. But they can be provided as problem state instructions if they are structured to use virtual addressing.

The invention further assures that a program issuing the SPIN/SPOUT and TAPS instructions is restricted to the resources currently assigned to the operating system under which the program is operating in an environment in which CPU(s) and other resources are shared among plural operating systems.

The invention may be utilized for controlling block (page) transfers between two electronic storage media in which one is a volatile main memory and the other is a non-volatile storage replacing the function performed by an electromechanical disk storage (such as the non-volatile storage provided by battery backed-up DRAMS or SRAMS) which may provide an external interface for the system. In such case, a program executing a user file control specification may use the SPIN/SPOUT and TAPS split-paging instructions to control the transfer of the blocks (pages) in a file between the media. This manner of operation enables the execution of the file control program to overlap the transfer of the blocks in a file in either direction between main memory and non-volatile storage to significantly speed up (shorten the time) for transferring the file.

BRIEF DESCRIPTION OF THE DRAWING

FIG. 8 represents an asynchronous paging request queue (APRQ) used by the preferred embodiment.

DESCRIPTION OF THE DETAILED EMBODIMENT

This invention controls the transfer of data units, herein called blocks (or pages) having a contiguous size of 4096 bytes. The data unit transfer is between two physical separate storages connected by one or more physical buses on which the data is transferred. The 4 kilobyte page is an example of the data unit size in the preferred embodiment, but any size data unit may be used with this invention. The physical storages used in the preferred embodiment are an expanded storage (ES) and a main storage (MS) which are connected with two buses handling page transfers in opposite directions.

Figure 1:
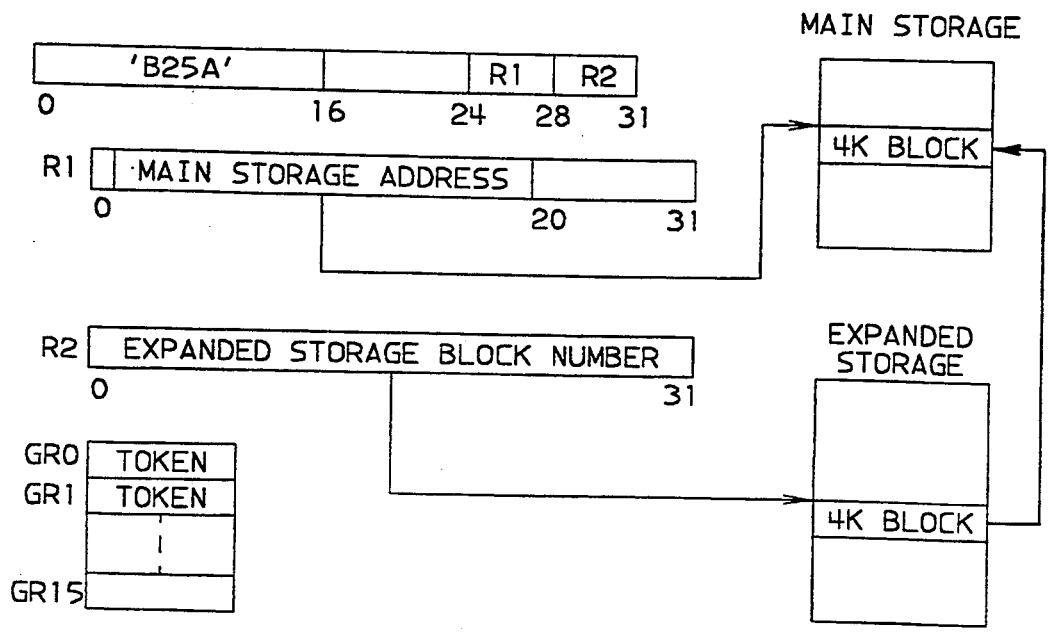
FIG. 1 is a representation of the start pagein (SPIN) instruction and its general operation.
Figure 2:
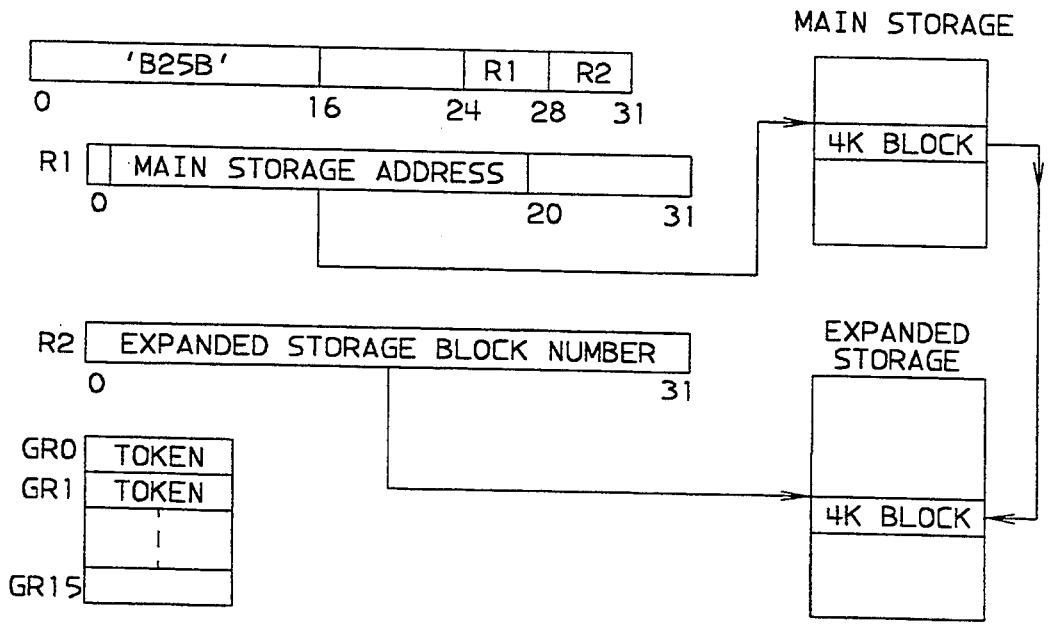
FIG. 2 is a representation of the start pageout (SPOUT) instruction and its general operation.

A single page transfer is initiated by a processor executing either the asynchronous pagein (SPIN) instruction shown in FIG. 1 or the asynchronous pageout (SPOUT) instruction shown in FIG. 2. The SPIN instruction in FIG. 1 initiates the copying of a 4 KB block from a page address in ES to a page address in MS. The SPOUT instruction in FIG. 2 initiates the copying of a 4 KB block from a page address in MS to a page address in ES.

The form of such SPIN and SPOUT instructions is shown in FIGS. 1 and 2, in which each includes R1 and R2 operands. R1 and R2 are each any of the general registers in a processor using the IBM S/370 or S/390 architecture. R1 is initialized to contain the page address in MS, and R2 is initialized to contain the page address in ES. The operation code (op code) of the respective instruction identifies if the instruction is a SPIN or SPOUT, and controls the direction of page movement between ES and MS.

The form of the address contained in R1 and R2 may be either real, absolute or virtual depending on how the system architecture prefers to address its pages in MS and ES. It is presumed in this embodiment that absolute addressing is used in these instructions. However, virtual addressing may be used as defined for the MovePage instruction in U.S. application Ser. No. 07/424,797 (P09-89-018), filed Oct. 29, 1989, previously cited herein. If virtual addressing is used, address translation is required before the data accesses are made in MS and ES.

Figure 3:
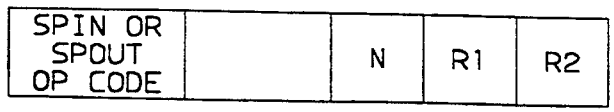
FIG. 3 is a representation of the SPIN/SPOUT instruction for transferring any number N of pages at contiguous addresses (real or virtual).

FIG. 3 shows a modified form of the SPIN and SPOUT instructions in which an additional operand, N, is provided to control a transfer of N number of pages contiguously addressed in ES and MS. And the R1 and R2 operand registers contain the addresses of the first of the N contiguous pages in the respective memories, ES and MS. The type of contiguity used is dependent on the type of addressing used. If absolute addressing is used for R1 and R2, the N pages are located at contiguous absolute addresses within ES and MS. If virtual addressing is used for R1 and R2, the N pages are located at contiguous virtual addresses (which may be located at scattered absolute addresses within ES and MS).

When a SPIN/SPOUT instruction is executed it returns a condition code (CC) of either 0 or 2 (CCs of 1 and 3 are not used), in which CC=0 means the instruction has successfully initiated a page transfer, and a CC=2 means no page transfer was initiated so that the SPIN/SPOUT instruction must be retried until it receives CC=0. The page transfer controlling processor operates independently of the processor executing the SPIN/SPOUT instruction. The other processor may be an MS controller (MSC), an ES controller (ESC), or an input/output processor (IOP), or any or all of them.

The SPIN/SPOUT instruction execution may directly or indirectly start the page transfer processor. Direct starting may be used if only one processor in the system can execute SPIN/SPOUT instructions, in which case a CC=2 indication is returned to indicate the page transfer processor is busy. Then the SPIN/SPOUT instruction must be re-executed until a CC=0 is received to indicate the other processor has accepted the SPIN/SPOUT request and has started performing the requested page transfer.

Indirect starting of the page transfer processor is used if a plurality of processors may execute the SPIN/SPOUT instruction in a system. Then a queue receives SPIN/SPOUT requests from respective processors executing SPIN/SPOUT instructions to buffer them from the page transfer processor, which may not be available to the request when it is put on the queue. When each SPIN/SPOUT instruction has its execution completed it has written SPIN/SPOUT request data in an element on the queue, which may be called an asynchronous paging request queue (APRQ).

The APRQ may have one or more elements. If the APRQ has more than one element, it may be operated first-in first-out (FIFO), or last-in first-out (LIFO), so that the queue eventually services each of its request to start the page transfer processor to perform the requested page transfer.

The preferred embodiment has each APRQ element structured as shown in FIG. 8. Each element contains a token field, which is the time-of-day (TOD) represented to a fraction of a microsecond when the element is written into the queue in the preferred embodiment. Actually, the token may be any value that uniquely represents each queue element and can be communicated to the processor executing the SPIN or SPOUT instruction generating the queue element. The generated queue element also contains a state field which indicates one of four states: "available", "active-not-in-process", "active-in-process" or "complete". An OP field indicates the requested operation, SPIN (pagein) or SPOUT (pageout). An MS PFRA field contains the MS page frame real address of the requested page transfer. An ES BN field contains the ES block number of the requested page transfer. The last two fields (H/G field and LPAR # field) are used only in a VM (virtual machine) host/guest system which may use the S/370 SIE (start interpretive execution) instruction. Such VM environment includes the IBM PR/SM (partitioned resources system management) system. The requestor field has a 0 or 1 to indicate if the requestor is a host (0) or guest (1). The LPAR # field contains the number identifying the PR/SM partition containing the host/guest.

A zero condition code (CC=0) is provided for an executing SPIN/SPOUT instruction as soon as it writes a request on a queue element. A CC=2 is provided for an executing SPIN/SPOUT instruction if the queue is full (no entry is currently available in the queue for receiving the asynchronous paging request).

When a queue element is available to a requesting SPIN/SPOUT instruction, queue management software writes a TOD token into the accessed queue element and into one or more predetermined registers in the requesting processor to identify the queue element to that processor for use by a following TAPS instruction. The queue token is later used by the following TAPS instruction to search for the assigned queue element to learn the current status of the request which is executed by another processor which is controlling the requested page transfer.

The queue token is returned to a general register pair, GR0 and GR1, in the initiating processor (executing the SPIN or SPOUT instruction) in the preferred embodiment. GR 0 & GR1 provide an implicit third operand for each SPIN or SPOUT instruction in the preferred embodiment, and GRs 0 & 1 must be available for receiving the queue token when any SPIN or SPOUT instruction is executed.

Accordingly, before an initiating processor uses its GR0 or GR1 for other instructions to be executed after a requesting SPIN/SPOUT instruction, the processor must first save (in MS or elsewhere) the queue token value that was returned in GRs 0 and 1. In the preferred embodiment, a 64 bit time-of-day value is stored in the assigned queue element and returned in GRs 0 and 1 of the initiating processor. The TOD value can be saved in MS and later retrieved from MS for use by the following TAPS instruction. (This will be later explained in regard to the TAPS instruction).

Such queue buffering operations may be done with various queue designs, such as having one queue per CEC (central electronic complex) system in the preferred embodiment. But other queue designs may be used by this invention, such as by providing a queue for each central processor executing SPIN/SPOUT instruction. With a per-processor type of queue, a priority order is needed among the different processor queues to determine which queue will provide each next request to be given use of the ES and MS resources.

The invention may be used in a system having a single processor, a single MS entity, and a single ES entity.

Or the invention may be used in a system having a plurality of page transfer (PT) processors and a plurality of ES entities, a plurality of MS entities, and a plurality of central processors (CPs) capable of concurrently executing SPIN/SPOUT and TAPS instructions. This type of system is discussed later in regard to FIG. 9. Concurrent operation by all PT processors and all CPs may be obtained by connecting each CP and each PT processor to a single centralized APRQ (asynchronous page request queue) to enable all CPs to write SPIN/SPOUT requests into the queue elements while all PT processors may be performing page transfers on all ES/MS paths in either direction under the control of the active queue elements.

Figure 4:
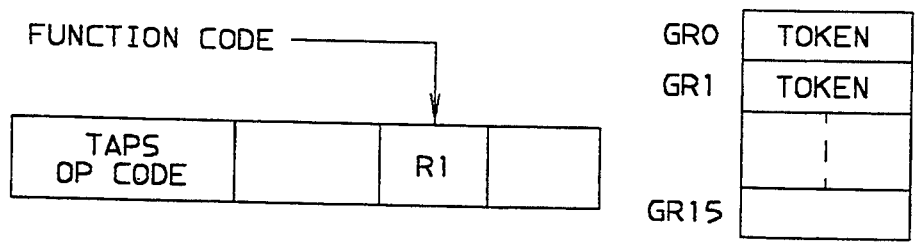
FIG. 4 illustrates a test asynchronous paging status (TAPS) instruction.

FIG. 4 illustrates an example of a TAPS (test asynchronous page status) instruction, which is executed after a SPIN of SPOUT instruction to detect if the requested page transfer has completed. If the TAPS instruction provides a successful completion status indication (by returning a CC=0 value), the program which issued that SPIN or SPOUT instruction is ready to proceed with whatever it wanted to do upon receiving an indication that the requested page transfer has completed.

In FIG. 4, the TAPS instruction has an explicit operand R1 and an implicit operand using general registers GR0 and GR1, of the sixteen GRs in an IBM S/370 processor. The R1 operand within the TAPS instruction operates differently from the R1 operand within a SPIN or SPOUT instruction. In TAPS, the R1 operand is defined to contain a function code (FC) having a value of 0 or 1, which control the way the TAPS instruction operates. A 0 value provides a "test only" FC, and a 1 value provides a "wait for completion and test" FC. The "test only" FC controls a completely asynchronous execution for its TAPS instruction. The "wait" FC controls a partially asynchronous execution for its TAPS instruction by allowing the page transfer to operate asynchronously from its initiation only upto the time of execution of the TAPS instruction, thereafter changing the page transfer to a synchronous operation by thereafter preventing the initiating processor from executing any instruction until completion of that TAPS instruction.

The implicit operand, GR0 and GR1, of the TAPS instruction contains the queue token returned for the initiating SPIN/SPOUT instruction. In the preferred embodiment, the queue token presumed to be a 64 bit time of day (TOD) value which is put into GR0 and GR1 prior to executing the TAPS instruction. If other instructions have been using GRs 0 and 1 after the prior SPIN/SPOUT instruction was executed, the token was stored in MS from which it must be retrieved and restored in GRs 0 and 1 before executing the TAPS instruction.

That is, after the transfer initiating processor executes a SPIN or SPOUT instruction (which quickly completes its execution), the initiating processor is quickly freed (released) and can execute any other instructions available to it, which may be instructions in the same program that issued the SPIN/SPOUT instruction or may be instructions in another program or routine unrelated to the initiated page transfer.

Then the initiating processor may asynchronously execute other instructions while its SPIN or SPOUT request is waiting in the queue for service by the page transfer processor and while the requested page transfer is being performed asynchronously. Accordingly, the initiating processor may execute other instructions in parallel (simultaneously) with the page transfer process at least up to the time the requesting program issues a TAPS instruction to find out the status of the requested page transfer (e.g. whether the page transfer is still underway or has been completed).

How a TAPS instruction executes is controlled by the setting of a function code (FC) in its R1 operand, which may contain a "test only" FC or a "wait" FC. If a TAPS instruction has a "test only" FC in its R1 operand, the TAPS execution is completed as soon as it reports the state of the associated queue element assigned to the related SPIN/SPOUT request, which reports the current execution state of the requested page transfer by setting the CC value of the TAPS instruction to immediately complete its execution. As soon as the CC is received, the TAPS processor can immediately execute its next instruction. This allows the initiating SPIN/SPOUT processor to execute other instructions asynchronously with the page transfer process being controlled by another processor.

If a TAPS instruction has a "wait" FC in its R1 operand, the TAPS instruction execution waits for a signal to its queue element from the page transfer processor that the page transfer has been completed before the TAPS instruction execution is complete. Only when the page transfer is completed is a CC returned to the TAPS processor to end the execution of the TAPS instruction and allow the TAPS processor to execute its next instruction. Accordingly a "wait" TAPS instruction remains in execution from its issuance until the monitored page transfer is completed. Accordingly if a "wait" TAPS instruction is issued before completion of the page transfer, a significant amount of wait time may occur during which the TAPS processor cannot be executing any other instructions. Consequently, the TAPS processor must end its execution of other instructions before executing the TAPS instruction and cannot execute any other instructions during the TAPS execution, which causes a "wait" TAPS instruction to operated synchronously with the page transfer. Such synchronous wait operation occurs without the need for the initiating program to have programmed any wait loop.

The above described slow synchronous operation for the "wait" TAPS instruction occurs only if it is issued before its page transfer is completed. However, if a "wait" TAPS instruction is not issued until after completion of its page transfer, its execution is completed immediately, and then the "wait" TAPS instruction operates as fast as the "test only" TAPS instruction.

The requested page transfer has completed successfully if a CC=0 is received for any TAPS instruction. Then for a SPIN instruction initiation, the TAPS processor has the option of immediately accessing the requested page in MS or of delaying such access, for example, by continuing to execute other available instructions and then later accessing the requested page in MS. In either case, no interruption occurs to the initiating processor for any operating system service.

For a SPOUT instruction initiation, a CC=0 for a following TAPS instruction indicates the page has been successfully stored in ES and the initiating processor can continue executing other available instructions without any interruption for any operating system services.

A CC=2 returned for a TAPS instruction indicates to the TAPS processor that the page transfer is active (has not completed). Then, the issuing processor must later again issue the TAPS instruction for determining if the transfer has successfully completed.

A CC=3 response indicates to the TAPS processor that no queue entry matches the token value in its GRs 0 & 1, and the tested page transfer has not successfully completed. A CC=3 response is provided if an error or abnormal exception condition occurred during the page transfer, in which case the queue element is reset to its available status. When the initiating program receives a TAPS CC=3 it may again request the page transfer, and has the option of reissuing the SPIN/SPOUT instruction or of issuing a synchronous paging instruction such as a PAGEIN/PAGEOUT or a MVPG instruction. The preferred technique in this embodiment is to issue a PAGEIN/PAGEOUT because in this embodiment no error exception conditions are provided for the split paging instructions (SPIN/SPOUT and TAPS). Then the error exception conditions designed into the PAGEIN/PAGEOUT are put into effect to test for any error or other abnormal exception conditions for the page transfer.

Figure 5:
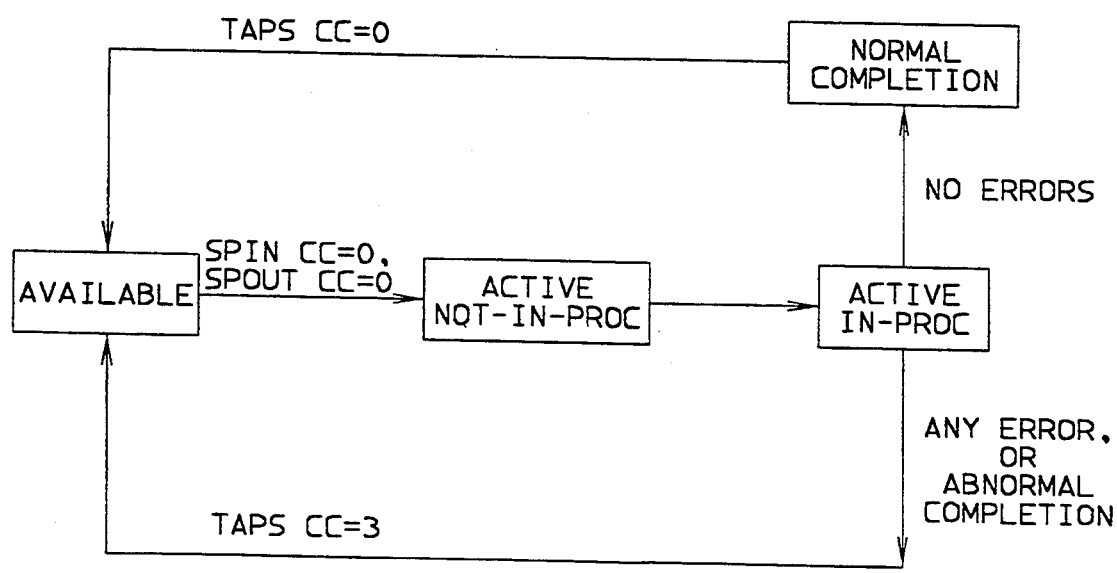
FIG. 5 is a state diagram showing the four states used in the operation of the split paging embodiment of the invention.

FIG. 5 shows the four states for any queue element, which are "available", "active-not-in-process", "active-in-process", and "normal completion". Each queue element has one of these states, and they control the CCs returned for the SPIN/SPOUT and TAPS instructions. The "available" state occurs for a non-assigned queue element which may be used by a requesting processor, and its content is invalid. The 00 code indicates the "available" state, the 01 code indicates the "active-not-in-process" state, the 10 code indicates the "active-in-process" state, and the 11 code indicates the "normal completion" state. The available state may be represented in a number of other ways, such as having an invalid flag bit set to invalid state to represent the "available" state, or by setting a token field to a zero value.

The "active" state begins when a SPIN/SPOUT instruction enters a request into an assigned queue element and ends when the requested page transfer is completed. There are two forms of the active state. The first is the "active not in process" state which exists after an element has been put on the queue but has not yet been taken by a page transfer processor. The second is the "active in process" state which exists after a valid element has been taken by a page transfer processor and is being processed. A requesting TAPS instruction receives a CC=2 response when it finds an "active" indication in the state field of a queue element found to have the TOD token value in the executing TAPS GR0-GR1 register pair in the preferred embodiment.

The "normal completion" state occurs when the page transfer has been successfully completed, when the state field in the queue element is posted with a normal completion indication by the page transfer processor. A CC=0 is sent to a requesting TAPS instruction testing an element marked as a "normally completed" element.

But if an error or abnormal end occurs to a page transfer, the state field in the element is changed from the "active in-process" state to the "available" state. In the preferred embodiment the requesting TAPS instruction receives a CC=3 response (indicating failure of execution) when no QE match is found with the TOD token value in the executing TAPS GR0-GR1 register pair or when a matching QE is found which has an "available" state.

Figure 6:
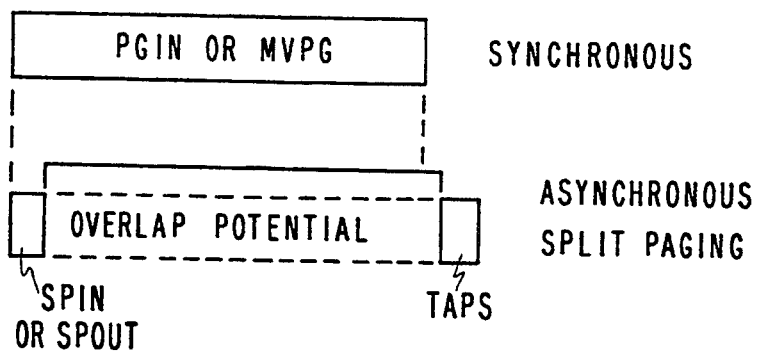
FIG. 6 is a timing diagram representing a comparison between a prior synchronous paging operation and an asynchronous split paging operation provided by this invention.
Figure 7:
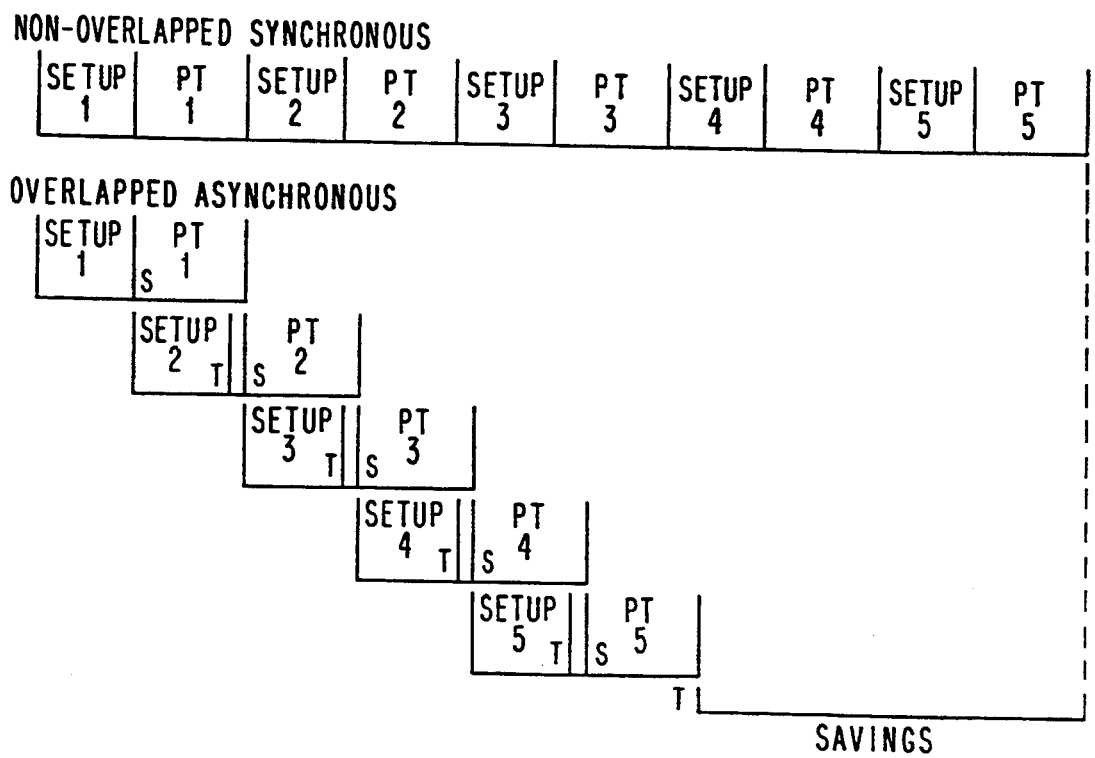
FIG. 7 is a timing diagram comparing prior serial synchronous paging operations with the overlap asynchronous paging operations available to this invention.

FIGS. 6 and 7 show the programming overlap advantage of the asynchronous split paging of the subject invention over the prior synchronous paging techniques. The synchronous paging diagram in FIG. 6 represents that all of the paging time required of a synchronous instruction, such as PAGEIN or MovePage, is being used by the initiating processor for controlling a transfer of a single page, which prevents any other instruction from executing during the synchronous page transfer process. By contrast FIG. 6 shows the split paging instructions (SPIN or SPOUT followed by TAPS) to execute in only a small fraction of the page transfer time, leaving most of the page transfer time available to the initiating processor to execute other instructions asynchronously (independent of) with the page transfer process.

The overlap potential (time available for overlapping other instructions with the page transfer process) is dependent on many execution factors, but in general it may be in excess of 50 percent of the page transfer time. FIG. 7 assumes 50 percent overlap potential time in which setup software is executed to execute the setup instructions needed to prepare for the next page to be transferred. Thus, the setup for page transfer 1 ends with issuance of a spin (S) instruction, which initiates page transfer (PT) 1.

The next setup 2 (for PT 2) overlaps PT 1 between the S and T instructions for PT 1. Setup 2 comprises the instructions issued by the initiating processor to prepare for PT 2. The remaining PTs and their preparatory setups in FIG. 7 have correspondingly overlapping characteristics. The resultant speedup in FIG. 7 is apparent with the overlapped example finishing in about 60 percent of the time of the non-overlapped case in this example of the transfer of five pages.

Figure 9:
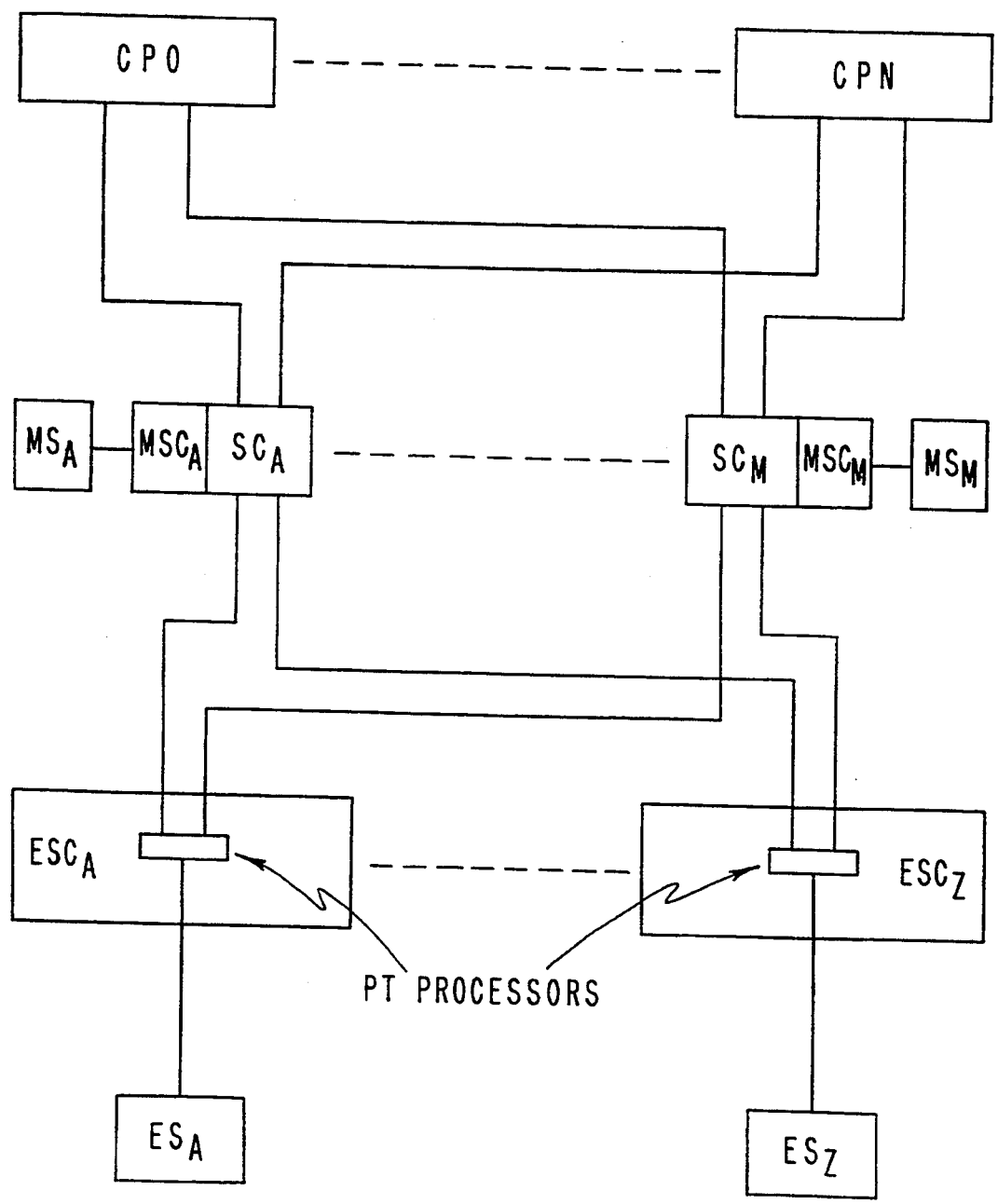
FIG. 9 represents a central electronic complex (CEC) containing a plurality of central processors (CPs), system controllers (SCs) with associated main storage arrays (MSs) and main storage controllers (MSCs), and expanded storage controllers (ESCs) with associated expanded storage arrays (ESs).

FIG. 9 represents a central electronic complex (CEC) having a plurality of central processors CPa through CPn. The CEC also contains a plurality of system controllers SCa through SCm, each SC having an associated main storage of MSa through MSm, and an associated MS controller of MSCa through MSCm. The absolute addresses in MSa–MSm are configured to be contiguous, so that any CP can address any byte location anywhere in the entire MS configuration. The CEC also contains a plurality of ES controllers, ESCa through ESCz, respectively connected to SCa–SCm. And ESa–ESz are respectively connected to ESCa–ESCz. The addresses in the ESs are 32 bit page block numbers, which are configured to be contiguous, so that any CP can address any page location anywhere in the entire ES configuration. Accordingly MSa–MSm each have a different range of absolute addresses, and ESa–ESz each have a different range of page block addresses.

The CEC in FIG. 9 operates with the APRQ queue in FIG. 8 which is located in an area in MS available only to microcode in the preferred embodiment. The APRQ comprises queue elements QE-0 to QE-k. The APRQ has a predetermined CP accessible location 11 in which the queue manager software (microcode) posts the address of its next "available" state queue element. Any CP executing a SPIN or SPOUT instruction takes the address in location 11 and writes its SPIN or SPOUT request directly into this self-assigned queue element since the assignment is made by the CP writing in the address taken from location 11. Any locking protocol of the types well known in the art is used among the CPs accessing location 11 to handle CP contention. As soon as any CP writes its request into the element identified by the predetermined CP address, the queue manager stores the address of the queue's next available element, or indicates a queue full indication therein if no queue element is currently available.

Also, the APRQ has another predetermined location 12 accessible to all page transfer (PT) processors in ESCa–ESCz. The queue manager posts the address of its next "active-not-in-process" state queue element into location 12. As soon as any PT processor becomes non-busy it accesses location 12 to obtain its next page transfer work item. Any locking protocol of the types well known in the art is used among the PT processors accessing location 12 to handle contention. A PT processor then performs the page transfer request in the queue element at the address obtained from location 12. As soon as any PT processor takes an address in location 12, the queue manager immediately stores therein the address of the queue's next "active-not-in-process" state queue element, or post therein a queue empty indication if no "active-not-in-process" state queue element is currently available.

Microcode in each CP for executing a SPIN or SPOUT instruction has the predetermined address of location 11 containing the APRQ's next available CP accessible address, or containing a queue full indication. This is explained in more detail in the operation of FIG. 10.

And microcode in each PT processor has the address of location 12 containing the APRQ's next PT accessible address or containing a queue empty indication. As soon as any PT processor is not busy, it looks into location 12 for the next PT accessible address for obtaining its next page transfer work to be performed. In this manner, all PT processors can be kept busy performing page transfers in parallel as long as there are active "active-not-in-process" state queue elements in the APRQ. This is explained in more detail in the operation of FIG. 11.

Accordingly, the CPs are putting SPIN/SPOUT requests onto the APRQ through location 11, and the PT processors are processing the active elements in the APRQ through location 12. An element in a "normally completed" state in the APRQ is not set to "available" state until a TAPS instruction accesses that element and returns a CC=0 response, which informs the requesting CP that its requested page transfer is complete and the page may be used.

Operation under Multiple Operating Systems

The virtual machine (VM) software provides a hypervisor operating system which enables guest virtual CPs to operate under host operating systems by using the S/370 SIE instruction under which multiple operating systems operate simultaneously in the same CEC, such as in an IBM 3090 computer system. The simultaneously operating systems, for example, may be plural MVSs (multiple virtual spaces) using respective subsets of the CEC's resources. This includes time shared use of CPU resources by the different operating systems. The operating systems are called hosts and the virtual CPs are guests. A widely used hypervisor is the IBM PR/SM system. (All of this is in the prior art, see U.S. Pat. No. 4,843,541).

In FIG. 8 each APRQ element contains a requestor type (H/G) which identifies the host/guest as the current owner of the respective queue element. The LPAR # field contains the partition number of the host/guest in a PR/SM system.

In the guest/host environment, each search of the APRQ by a TAPS instruction not only searches on the token field, but also searches on the H/G and LPAR # fields so that a host/guest is restricted to accessing only the queue elements associated with the host or guest partition. If no match occurs, CC=3 is returned to the CP for a TAPS instruction.

This invention takes special precautions when it is used in the VM environment (e.g. plural SIE instructions in a PR/SM CEC), because it is possible to switch a CPU from one partition to another at the end of a time slice, which may be during an asynchronous page transfer before it is completed. The centralized APRQ ensures correct operation of the TAPS instruction whether the partition is re-dispatched on the same or a different physical CP.

Independent Operation of CPs and PT Processors

The SPIN, SPOUT and TAPS instructions are executed by any of the CPs in FIG. 9, in which each page transfer (started by a SPIN or SPOUT instruction) is controlled by any of the PT processors in any of its ESCs in FIG. 9. There are N number of CPs, Z number of PT processors in FIG. 9 and M number of MS's. There is one MSC and SC per MS. In most cases, there may be a substantially lesser number of PT processors than CPs.

The CPs and PT processors operate asynchronously of each other. In the preferred embodiment a single queue (APRQ) maintains the independent operation between the CPs and PT processors. And a single queue element provides a buffer between each SPIN/SPOUT instruction executed by any CP and any PT processor performing the requested page transfer.

A work item is put on the queue when a SPIN/SPOUT request is written into an available queue element by a SPIN/SPOUT instruction being executed by any CP. And a work item is removed from the queue when a TAPS instruction executed by a CP finds its requesting queue element now indicates the completed status for the requested page-transfer. The PT processor which performed the particular page transfer need not be identified to its requesting CP.

In the preferred embodiment, all CPs access the single queue interface location 11 in FIG. 8 for entering each page-transfer request item of work on the APRQ. And all PT processors access the single queue interface location 12 for obtaining a next Page-transfer item of work from the APRQ.

Each interface location 11 or 12 is momentarily locked while it is being accessed for an address by a CP or PT processor. The interface location is unlocked as soon as the location is updated by the CP or PT processor.

Furthermore, when location 11 is locked by a central processor, location 12 may be unlocked and accessible to any PT processor. And when location 12 is locked by any PT processor, location 11 may be accessed by any central processor. When either interface location 11 or 12 is locked, the QE it addresses is not being addressed by any other processor.

In this manner independent operations are maintained among all PT processors and all CPs.

Since the TAPS instruction does not lock location 11 (except for the APRQ full case), there is minimal lock contention between a SPIN or SPOUT instruction executing on one CP and a TAPS instruction executing on a different CP.

Figure 10:
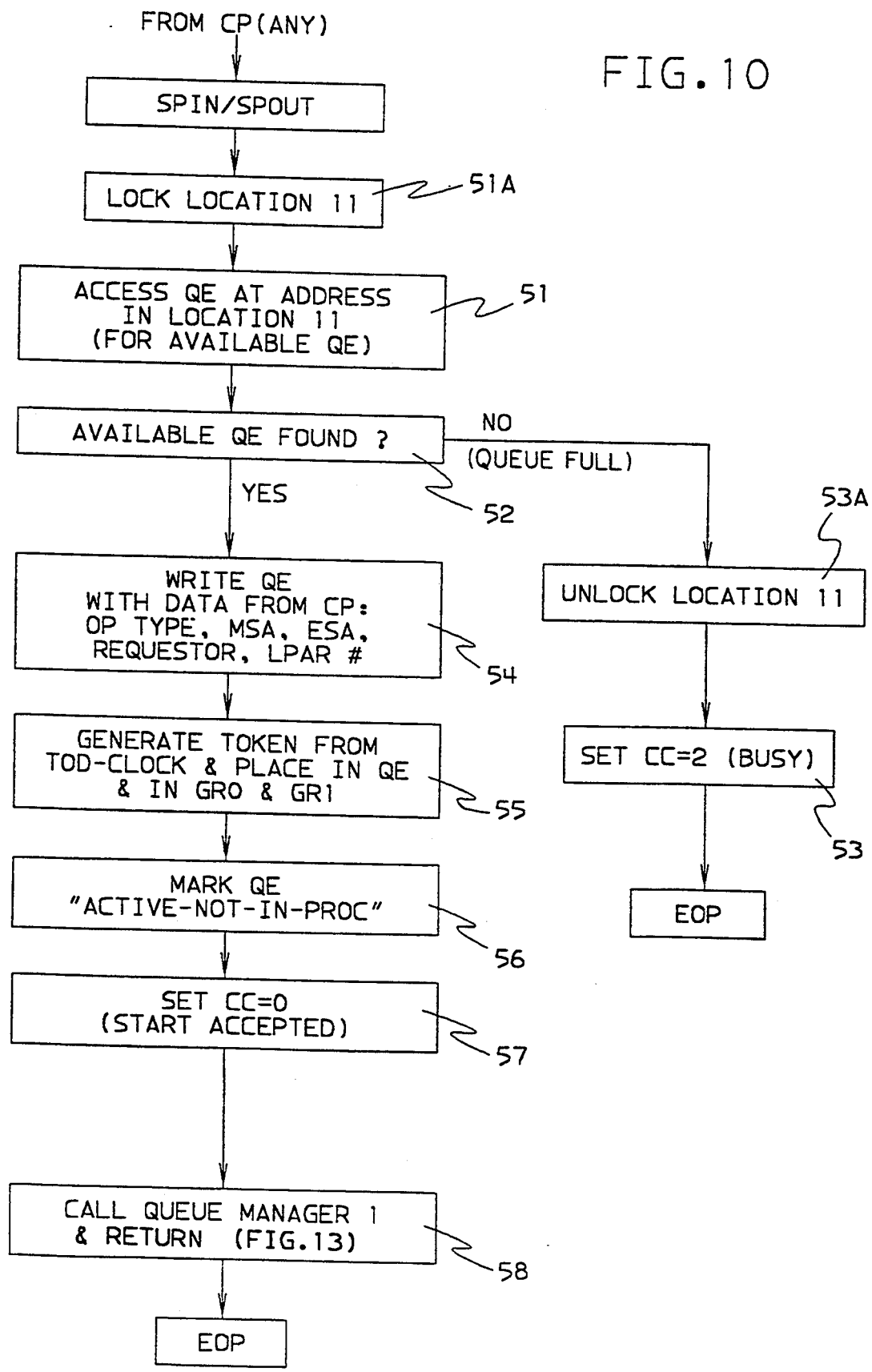
FIG. 10 is a flow diagram comprising detailed steps in a preferred method embodiment for executing the SPIN and SPOUT instructions by any of the CPs represented in FIG. 9.

Detailed operation of the SPIN/SPOUT Instruction (FIG. 10)

FIG. 10 represents the operation of the hardware/microcode in each CP in the system of FIG. 9 for executing either the SPIN or SPOUT instruction. The CPs in the system operate independently of each other, and any CP may be executing any instruction at any time.

In step 51A the CP interface location 11 is locked by a requesting CP at the beginning of the execution of the SPIN or SPOUT instruction. Then only the requesting CP can update location 11 to prevent queue contention with any other CP during the update which could cause errors in the instruction processing. If a requesting CP finds location 11 is locked at the time of a request, it must make subsequent requests until it finds location 11 unlocked.

Next step 51 accesses the address in the now locked CP interface location 11 and uses that address to access a queue element (QE) for use by the current SPIN/SPOUT instruction.

Step 52 tests the content of location 11 to determine that it contains an address, rather than a "queue full" indication. If the "queue full" indication is found, the no path is taken to step 53A unlocks location 11, and step 53 sets CC=2 into the condition code register of the current CP to end the operation of the SPIN/SPOUT instruction. But if a QE address is found in location 11, the yes path is taken to step 54, in which the CP writes information into some of the QE's field: 0 or 1 in the OP field for SPIN or SPOUT, respectively; the MS address of the page; the ES address of the page; and if applicable, 0 or 1 for a host or guest into the H/G field, and the CP's current logical partition number into the LPAR # field.

Step 55 generates a token by copying the time-of-day (TOD) into the token field as a 64 bit value, and this token is also copied into the GR0-GR1 pair of the current CP for use by the following TAPS instruction.

Step 56 marks the state field with 01 (for the "active-not-in-process" state). The other states are 00 for the "available" state, 10 for the "active-in-process" state, and 11 for the "normal completion" state.

Steps 54, 55 and 56 may be executed in order, or simultaneously, for writing into the locked QE. Then step 57 sets CC=0.

And step 58 calls queue manager 1 (QM1 shown in FIG. 13) to execute it. When QM1 completes its execution, it returns to the SPIN/SPOUT process which called it, and the SPIN/SPOUT instruction ends its processing (EOP). The processing by queue manager 1 will search the APRQ for another QE in the "available" state and will put its address into location 11 in preparation for a next SPIN/SPOUT request from any CP in the system. Thus, the SPIN/SPOUT execution is not slowed down by having to do any preliminary search of the queue to find an available QE.

Figure 11:
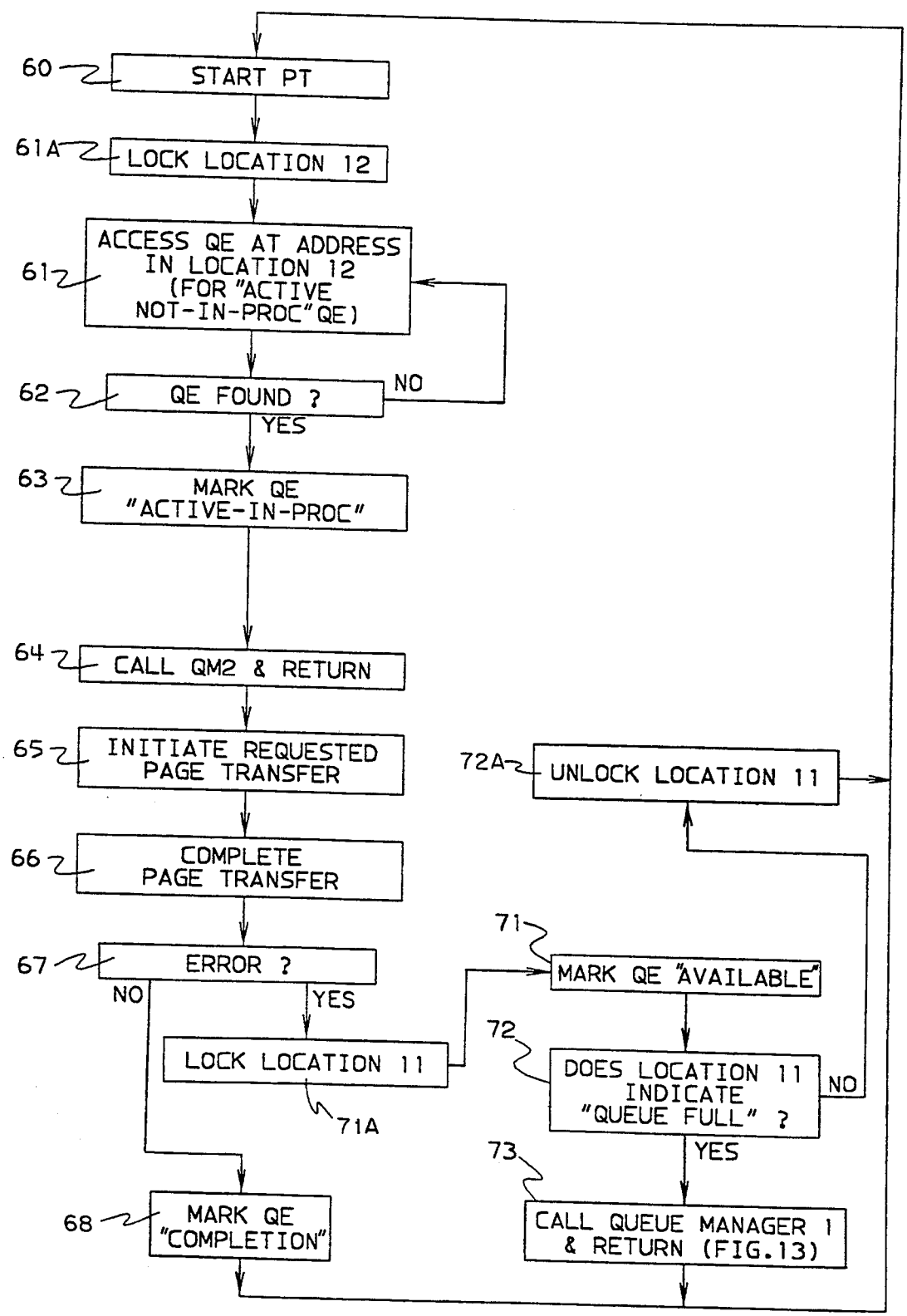
FIG. 11 is a flow diagram comprising the detailed steps in a preferred method embodiment utilized by any of the page transfer (PT) processors located in the ESCs in FIG. 9 for controlling the transfer of a page between any ES and any MS in FIG. 9.

Detailed operation of the PT Processors (FIG. 11)

FIG. 11 represents the operation of hardware/microcode provided for each PT (page transfer) processor in the system of FIG. 9. The PT processors in the system of FIG. 9 operate independently of each other and independently of the CPs. The APRQ disclosed herein keeps all PT processors continuously working independent of each other. As soon as any PT processor finishes a page transfer, it goes back to the PT interface location 12 to get another page transfer work item, which is represented by the "active-not-in-process" state in QEs in the APRQ. No PT processor will be idle as long as there is any QE in an "active-not-in-process" state in the APRQ.

After any PT processor in the FIG. 9 system has completed a page transfer, it attempts to get a next work item by entering step 60 in FIG. 11 and performs step 61A of locking the PT interface location 12. Then step 61 uses the address in location 12 to access a queue element (QE) having the "active-not-in-process" state, unless location 12 contains a "queue empty" indication (no such QE presently in the APRQ). Step 62 tests the content of location 12. If the "queue empty" indication is found, the no path is taken back to step 61 and the PT processor loops back to step 61 (until an "active-not-in-process" QE is put into the queue by a subsequent SPIN/SPOUT instruction execution, and queue manager 2 in FIG. 14 puts the QE address into location 12).

But if step 62 finds a QE address in location 12, the yes path is taken to step 63. In step 63, the state field in the QE is changed by writing in it the 10 state code representing the "active-in-process" state.

Figure 14:
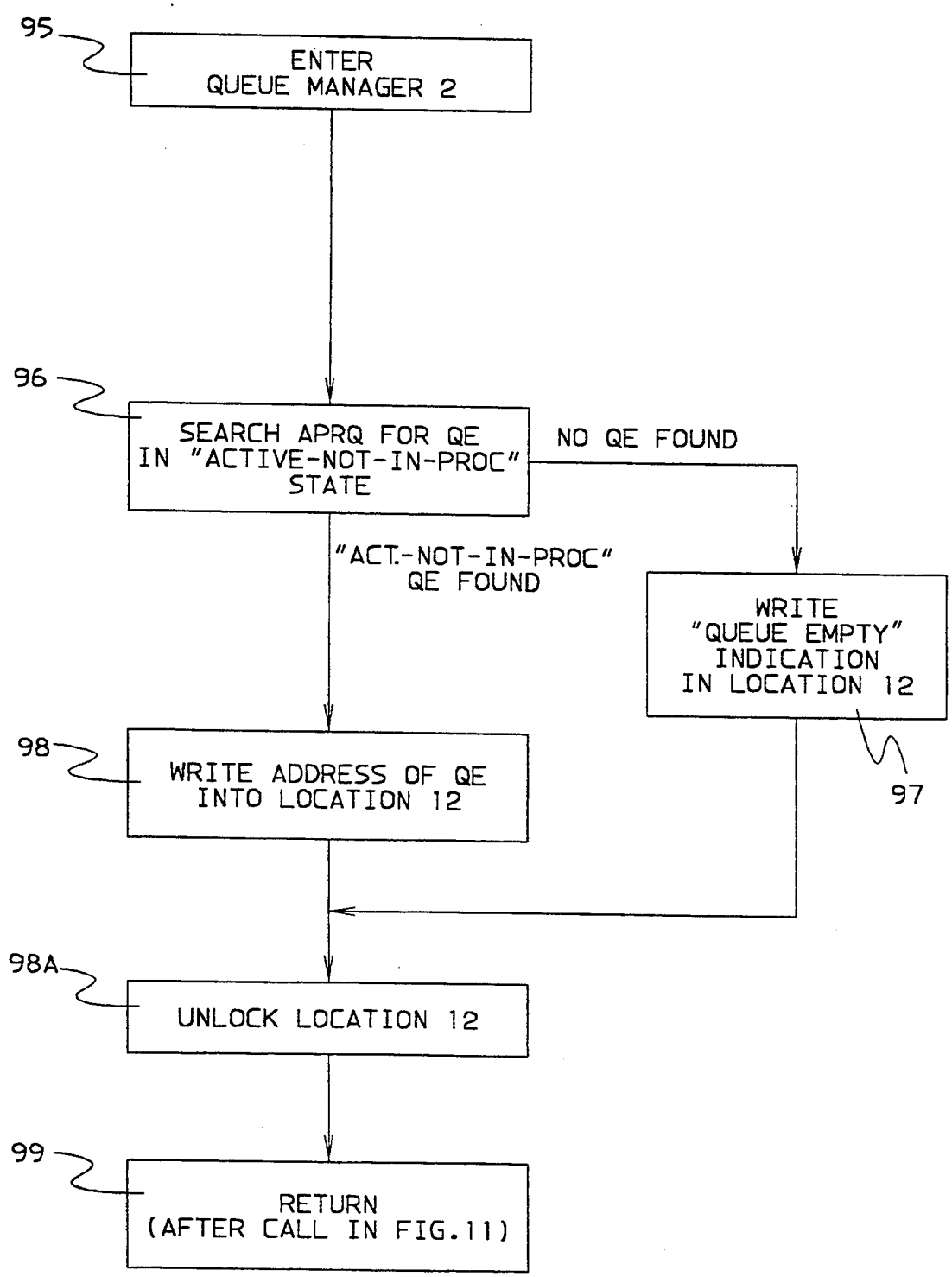
FIG. 14 is a flow diagram comprising detailed steps of a second queue manager used with the PT processor embodiment represented in FIG. 9.

Next, the queue manager 2 (QM2) in FIG. 14 is called by step 64, which executes and returns to the instruction in the FIG. 11 process following its call instruction. The QM2 process replaces the address in location 12 with the address of another QE having the "active-not-in-process" state, or with a "queue empty" indication.

Next, the PT processor executes step 65 to initiate the page transfer requested by the obtained QE. And step 66 controls the completion of the page transfer. Steps 65 and 66 usually take a significant amount of time compared to the execution of the other steps in FIG. 11.

The following step 67 tests if any error(s) have been encountered. The no path is taken to step 68 if no errors have been encountered, and step 68 changes the QE's state field by marking it with the "normal completion" state (11), which will be tested by a following TAPS instruction. A compare and swap type of instruction is use to perform step 68 to prevent contention with any other processor.

Then step 68 loops to the start of the PT process to again look at location 12 for another item of work by getting another "active-not-in-process" QE address from it.

But if step 67 found an error condition (inclusive of any condition capable of causing an abnormal end to the page transfer operation), its yes path is taken to step 71A which locks location 11. Then, step 71 invalidates the QE by changing its state field by marking it with the "available" state code 00 (which indicates the contents of the QE are invalid). A compare and swap type of instruction is used to perform step 71 to prevent contention with any other processor.

Then, step 72 tests if location 11 has a "queue full" indication. If not, the page transfer processing is completed, step 72 unlocks location 11, and it loops back to the start of the process in FIG. 11 for the PT processor to obtain its next item of work.

Figure 13:
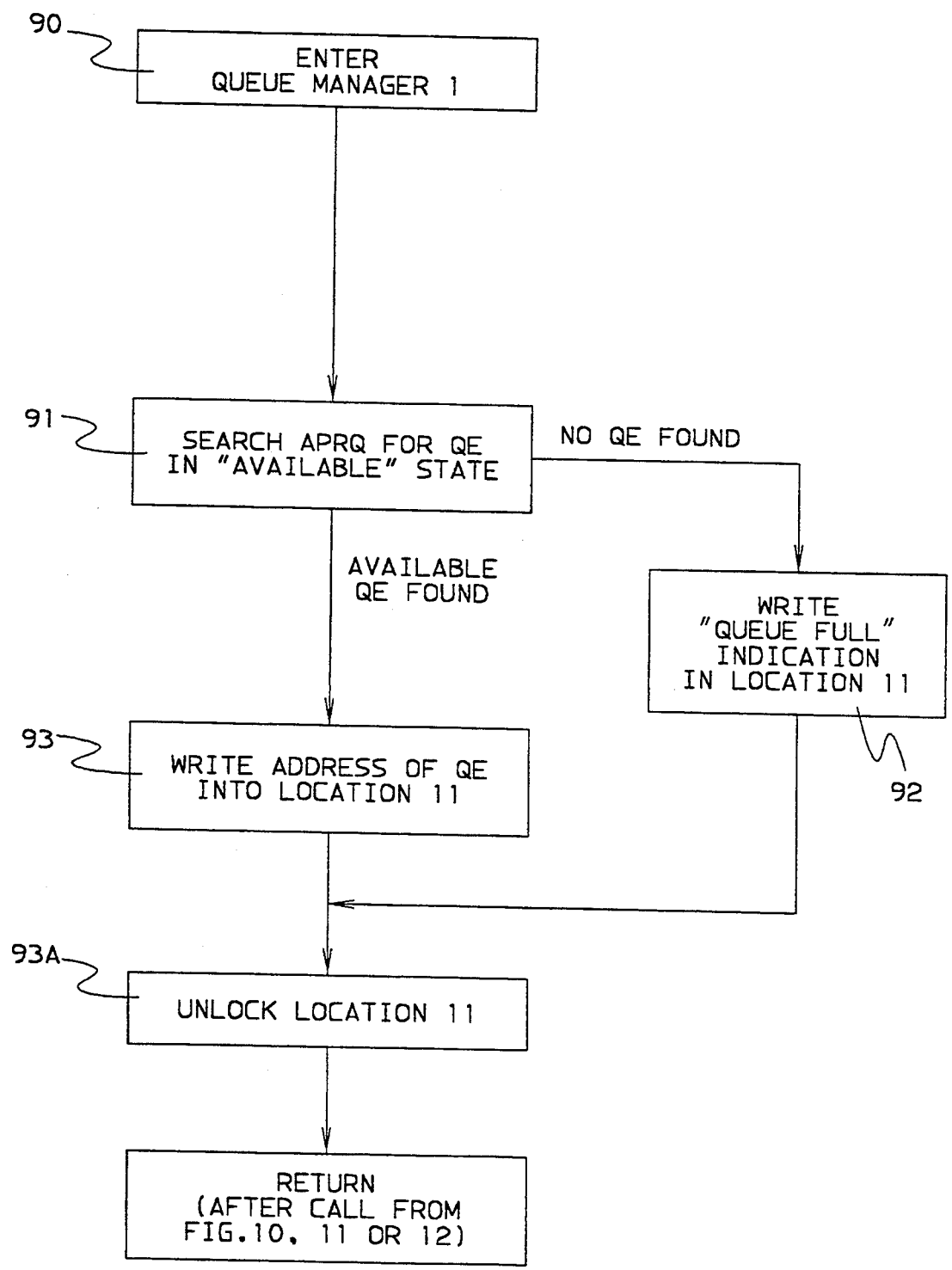
FIG. 13 is a flow diagram comprising detailed steps of a first queue manager used with the SPIN/SPOUT embodiment represented in FIG. 9.

But if step 72 finds a "queue full" indication, the yes path goes to step 73 which calls QM1 in FIG. 13 to replace the "queue full" indication in interface location 11 with another QE, which may be the QE made available in step 71. When completed, QM1 process returns to the instruction in the PT process following the call made by step 73 and the PT process loops back to its start 60 in FIG. 11 to obtain its next item of work by getting another "active-not-in-process" QE address from location 12.

Figure 12:
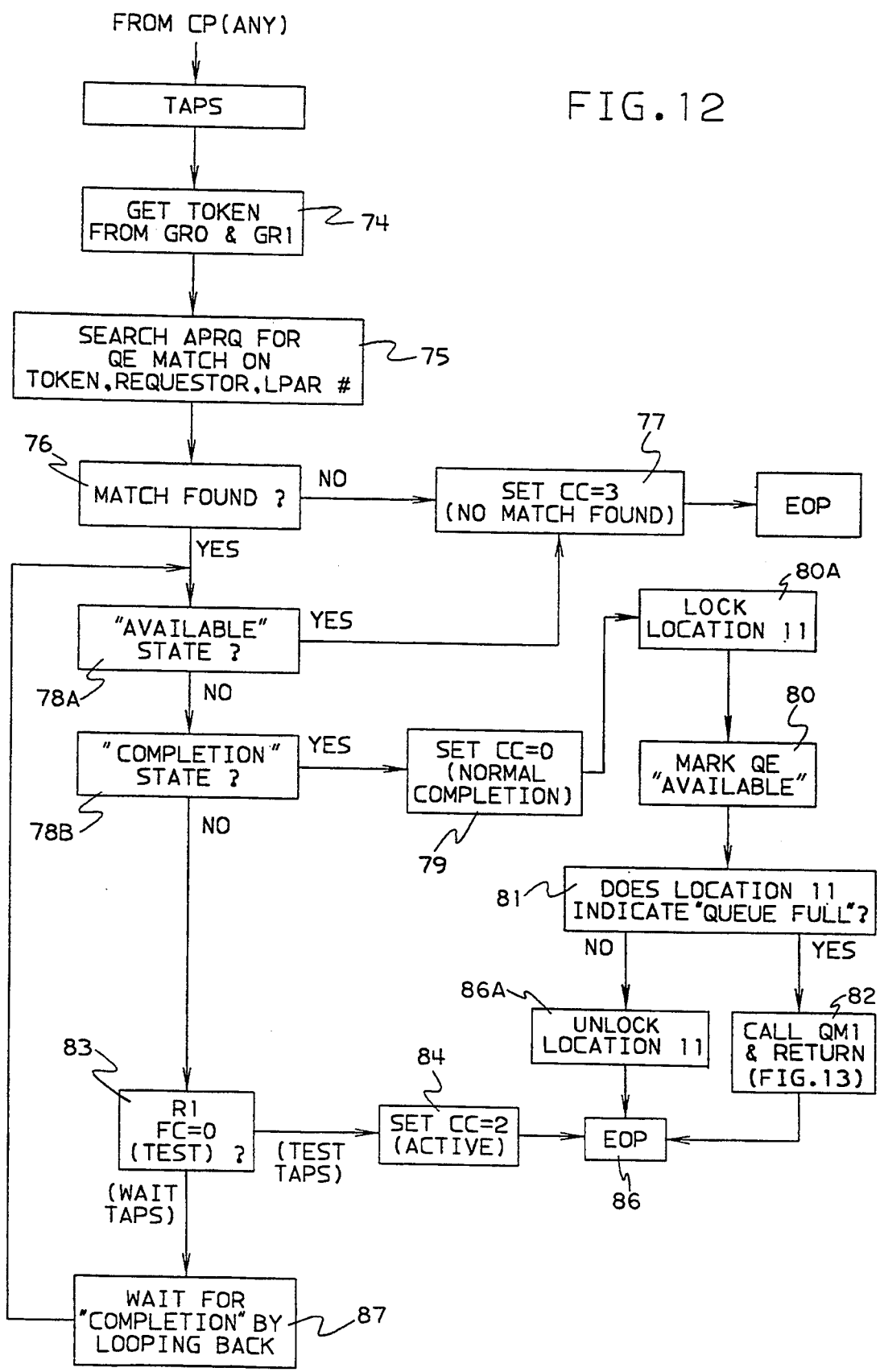
FIG. 12 is a flow diagram comprising detailed steps in a preferred method embodiment for executing the TAPS instruction by any of the CPs represented in FIG. 9.

Detailed operation of the TAPS Instruction (FIG. 12)

FIG. 12 represents the operation of the hardware/microcode in each CP in the system of FIG. 9 for executing the TAPS (test asynchronous paging status) instruction. The CPs in the system operate independently of each other, and any CP may be executing any TAPS instruction at any time. Any CP in the system begins executing a TAPS instruction by step 74 accessing a token in its GRs 0 and 1, which was put into GRs 0 and 1 by its prior SPIN/SPOUT instruction execution. If the token had been removed from GRs 0 and 1, it must be restored from a saved location prior to execution of the TAPS instruction.

Next step 75 searches the APRQ in FIG. 8 to fine any queue element (QE) which has a token field that matches its token in GRs 0 and 1. Also if the system is operating in a SIE instruction environment, additional matches are required on the H/G and LPAR # fields with those parameters of the current program on the TAPS executing CP.

Step 76 tests if a match is found in the APRQ. The no path is taken to step 77 if no match occurred in the search, it sets CC=3 for the TAPS instruction, and the end-of-process (EOP) is reached, ending execution of the TAPS instruction.

But if step 76 finds a match in the APRQ, the yes path is taken to step 78A, which tests the state field in the matched QE for the 00 state code (for the "available" state).

If the found QE is in the available state, the yes path to step 77 is taken to set CC=3 for the TAPS instruction, and the end-of-process (EOP) is reached.

But if step 78A finds the QE is not in the "available" state, the no path is taken to step 78B, which tests the state field in the matched QE for the 11 state code (for the "normal completion" state.

If the found QE has a completion state, the yes path to step 79 is taken to write CC=0 into the condition code register of the current CP. Step 80A locks location 11. Then, step 80 marks the QE as being available by writing the 00 value into the QE's state field.

This ends the effective execution of the TAPS instruction. Then, step 81 tests if location 11 has a "queue full" indication. If not, step 86A unlocks location 11 and the end-of-processing (EOP) 86 is reached for the TAPS instruction. But if step 81 finds a "queue full" indication, Step 82 is entered to call QM1 in FIG. 13 to replace the "queue full" indication in interface location 11 with another QE, which may be the QE made available in step 80. The QM1 process returns to the TAPS EOP 86.

If the completion state was not found by step 78B, the QE is still in its "active" state and the no path is taken from step 78B to step 83 which tests the function code (FC) field in the matched QE. The FC field can have a value of 0 or 1 to represent the "test TAPS" or "wait TAPS" form of the instruction, as previously explained.

If FC=0, the test TAPS path is taken to step 84 which sets CC=2 for the TAPS instruction to indicate its matched QE is still in the "active" state (either "active-not-in-process" or "active-in-process"). The TAPS instruction must then be reissued later to determine if the page transfer has reached its "completion" state.

If FC=1, the wait TAPS path is taken to step 87 which loops back to step 78A in the process of retesting for the occurrence of the available state or completion state. The looping continues a synchronous type of execution for a "wait" TAPS instruction that extends its wait time until its page transfer completion is indicated.

Detailed operation of Queue Manager 1 (FIGS. 13)

FIG. 13 represents the operation of the hardware/microcode in the system of FIG. 9 for continuously maintaining the address of a usable QE in the CP interface location 11. The continuous availability in location 11 of the address of a usable QE to all CPs in the system enables the CPs to speed up their execution of SPIN/SPOUT instructions by eliminating the slow search process from the execution of these instructions. That is, the search will have proceeded each SPIN/SPOUT request by having been done by the queue manager.

Thus step 90 of the queue manager is entered by a call from a SPIN/SPOUT or TAPS instruction. When entered, step 91 searches the APRQ for a QE in an "available" state.

The search finds the first QE having the 00 "available" value in its state field. Then step 93 is entered to write the address of the found QE into location 11. (Any order may be used for the QEs in the APRQ, and any number of QE may be used in the APRQ although a minimum number is required to maintain a continuous flow of work in the system.)

Step 93A is entered from step 93 to unlock location 11, and the process of queue manager 1 is ended with the EOP step.

However, if the search does not find any QE having an "available" state, the "no QE found" path is taken from step 91 to step 92 which writes a "queue full" indication in location 11. The "queue full" indication represents that no available QE currently exists in the APRQ, because all QEs are in other (busy) states of operation which mostly will include the two "active" states, but can also include the "normally complete" state (which is waiting for a TAPS instruction execution to change it into the "available" state). Then step 93A is entered from step 92 to unlock location 11.

Finally, QM1 ends by returning to the instruction in the process which called it in any of FIGS. 10, 11 or 12.

Detailed operation of Queue Manager 2 (FIG. 14)

FIG. 14 represents the operation of the hardware/microcode in the system of FIG. 9 for continuously maintaining the address of an "active-not-in-process" QE in the PT processor interface location 12.

The continuous availability of a usable QE in location 12 to all PT processors in the system enables the PT processors to speed up the number of page transfers that they can perform. Queue manager 2 eliminates the need for the PT processors to search the APRQ for work to be performed, by having the result of a previously done the search present the address of a usable QE in location 12 to any requesting PT processor.

Queue manager 2 is entered at step 95 by any of the plural PT processors in the system. Step 96 searches the APRQ for a QE in an "active-not-in-process" state.

The search finds the first QE having the "active-not-in-process" 01 code in its state field. Then step 98 is entered to write the address of the found QE into location 12.

Step 98A is entered from step 98 to unlock location 12, and step 99 causes the process of the queue manager 2 to return to the instruction after the instruction which called QM2.

However if the search by step 96 does not find any QE having an "active-not-in-process" state, the "no QE found" path is taken from step 96 to step 97 which writes a "queue empty" indication in location 12. The "queue empty" indication represents that no available QE currently exists in the APRQ having the required state. Then step 98A is entered from step 97 to unlock location 12.

Finally, step 99 ends the QM2 process by returning to the routine which called it in the processing of FIG. 12.

Multiple Asynchronous Page Transfers

The SPIN/SPOUT instruction processing described above transfers one page per instruction. Accordingly, a separate SPIN or SPOUT instruction is needed for each page to be transferred. A simple looping program can control the multiple use of a SPIN/SPOUT instruction for transferring N number of pages.

FIG. 3 shows a multiple SPIN and SPOUT instruction (which can be acronyms as MSPIN and MSPOUT). Each MSPIN and MSPOUT instruction contains a field N indicating a transfer of N number of pages located at contiguous page addresses in MS and ES. Each MSPIN/MSPOUT instruction also has an operand R1 which contains the address of the first page of a contiguous sequence of pages in MS, and an operand R2 which contains the address of the first page of a contiguous sequence of pages in ES.

The modifications to the APRQ in FIG. 8 and to the processes in FIGS. 10 through 14 in order to control operations of the MSPIN and MSPOUT instructions are as follows: an additional field, N, is added in the QEs in the APRQ of FIG. 8.

The process in FIG. 10 for the spin/spout instruction execution is also applicable to the MSPIN/MSPOUT instruction with a slight modification: Step 54 is changed to also write the N value from the instruction operand into the added N field in the QE being accessed.

The process in FIG. 11 for the PT process has its steps 65 and 66 transfer N number of pages, instead of one page. The PT process is not put into "completion" state until all N pages have been transferred.

The process in FIG. 11 for the TAPS process is used without change. However, the overlap potential is changed, and the TAPS instruction is preferably issued (by the program requesting the multiple page transfer) around the time when end of the multiple page transfer is estimated, in order to maximize the period of contiguous overlap potential. During such overlap time, any instructions can be executed including instructions setting up the next multiple page transfer.

The queue manager processes in FIGS. 13 and 14 can be used without change.

Miscellaneous

Special instructions may be provided to support the SPIN/SPOUT and TAPS instruction operations. For example, a Clear Queue instruction may be provided to reset (clear) the queue in FIG. 8 by setting the state field in every queue element to the available state (00), and by resetting any operations in process in the PT processors.

Further a time-out may be started with the start of execution of each SPIN, SPOUT or TAPS instruction (as is done with many conventional instructions) by resetting (clearing) all queue elements to their available state if the time-out occurs. This assures system recovery if something goes wrong during the execution process, e.g. the queue becomes full and cannot handle any additional SPIN/SPOUT instruction, or if there is a hardware failure somewhere in the system affecting the execution, etc.

While the invention has been particularly shown and described with reference to a preferred embodiment thereof, it will be understood by those skilled in the art that various changes in form and details may be made therein without departing from the spirit and scope of the invention as defined by the appended claims.

Having thus described our invention, what we claim as new and desire to secure by Letters Patent is:

1. A method for enabling a computer system containing a plurality of central processors (CPUs) to free the CPUs from doing detailed control operations required in transferring one or more pages of data in and between plural electronic memory media used by the computer system, the method comprising the steps of:

issuing a start instruction by a first CPU executing a program in which the start instruction provides a transfer request containing a specification for transferring one or more pages of data from a source location to a destination location in the memory media;

storing the transfer request in a queue element from which a page transfer (PT) processor obtains the transfer request, and setting a transfer-status indication in the queue element to an incomplete state to indicate work for the transfer request has not been completed, but indicating completion of the start instruction at the first CPU;

generating a unique identifier as a token for each transfer request provided for each start instruction issued by any CPU, and storing a copy of the token by the CPU in association with each issued start instruction, and storing the token in the queue element receiving the transfer request provided by the issued start instruction;

initiating work for the transfer request by the PT processor obtaining the transfer request from the queue element and controlling copying of page(s) of data from the source location to the destination location as represented in the specification contained in the transfer request;

executing by the first CPU of other instructions in the program following the start instruction asynchronously with operations of the PT processor for the transfer request;

setting the transfer-status indication in the queue element to a completed state by the PT processor when work is completed for the transfer request;

later-executing in the program on any CPU a test asynchronous paging status (TAPS) instruction associated with the start instruction which was previously-executed, the associated TAPS instruction accessing the queue element and testing the state of the transfer-status indication;

setting a condition code in the CPU executing the associated TAPS instruction to indicate the state of the transfer-status indication to indicate a current state of work for the transfer request by the PT processor, and indicating completion of execution of the TAPS instruction.

2. A method of transferring data in a computer system as defined in claim 1, the executing step further comprising:

writing a partition number and a host/guest representation into the related queue element for a program using the TAPS instruction.

3. A method of transferring a page of data in a computer system as defined in claim 1, the signalling step further comprising:

immediately signalling a status indication for the associated queue element to any CPU executing the TAPS instruction.

4. A method of transferring data in a computer system as defined in claim 1, the method further comprising:

locating a queue header in one of the electronic memories, and locating the queue element from information in the queue header; and storing a plurality of transfer requests in a corresponding plurality of queue elements respectively located through the queue header, the transfer requests being associated with different start instructions in the program;

signalling the copy of the token by the CPU to the queue header during execution of a later executed TAPS instruction associated by the copy of the token with an earlier issued start instruction storing the copy of the token to associate the TAPS instruction with the earlier issued start instruction, matching the copy of the token with a token in each queue element in the queue for finding a matching token in an associated queue element containing an associated transfer request provided by the earlier issued start instruction, testing the transfer-status indication in the associated queue element for the TAPS instruction to determine the state of the associated transfer request including whether work for the associated transfer request has been completed or not, and signalling the state to the CPU, and generating a condition code in the CPU for the TAPS instruction based on the state of the associated transfer request signalled to the CPU.

5. A method of transferring data in a computer system as defined in claim 4, the method further comprising:

indicating an available state for the transfer-status indication in any queue element not currently active in the queue to indicate the queue element is available for receiving a transfer request for a start instruction; and changing the available state to an active-not-in-process state for the transfer-status indication in a queue element receiving a transfer request of a start instruction issued by the CPU for indicating that the transfer request is represented by the queue element and is not being processed by any PT processor.

6. A method of transferring data in a computer system as defined in claim 5, the method further comprising:

modifying the active-not-in-process state of the transfer-status indication to an active-in-process state for the transfer request in the queue element by the PT processor accepting the transfer request to start a page transfer.

7. A method of transferring data in a computer system as defined in claim 6, the method further comprising:

changing the active-in-process state of the transfer-status indication to a completion state for the queue element when the PT processor completes the page transfer.

8. A method of transferring data in a computer system as defined in claim 7, the method further comprising:

changing the transfer-status indication from a completion state in a queue element to the available state when the completion state of the queue element is tested by a TAPS instruction being executed by the CPU in association with a prior executed start instruction to free up the queue element for use by another start instruction.

9. A method of transferring data in a computer system as defined in claim 4, the method further comprising:

changing the transfer-status indication from the active-in-process state to the available state for the associated queue element when the PT processor fails to complete the transfer request specified in the queue element to indicate to invalidate the transfer request in the queue element and indicate the queue element contains a failed transfer request and make the queue element available for use by another start instruction, and generating a condition code in the CPU for the TAPS instruction for indicating the associated transfer request signalled to the CPU has failed.

10. A method of transferring data in a computer system as defined in claim 9, for responding to the associated transfer request of a previously issued start instruction indicated as having failed, the method performing the further steps of:

executing by the first CPU of a fully-supported synchronous page transfer instruction for which exception conditions are detected and for which a transfer request is provided with a specification for performing the same work as for the failed transfer request; and using the exception handling supported by the computer system for the synchronous page transfer instruction to handle an exception condition encountered by the start instruction and not supported for the start instruction.

11. A method of transferring data in a computer system as defined in claim 1, the method further comprising:

executing another program between the steps of issuing the start instruction and later issuing the associated TAPS instruction, while the associated transfer request for the program is being controlled by the PT processor.

12. A method of transferring data in a computer system as defined in claim 1, the method further comprising:

redispatching the program which issued the start instruction, and the program later issuing a TAPS instruction to be executed on any CPU to test for the status of the associated transfer request.

13. A method of transferring data in a computer system as defined in claim 1, the method further comprising:

selecting a queue element having a transfer-status indication indicating an available state for a plurality of queue elements used for communicating the start instruction to the PT processor;

storing unique identifier as a token in a selected queue element in a location known to the first CPU executing the start instruction for which the selected queue element becomes the associated queue element for the start instruction;

inserting a specification for the transfer request into fields in the associated queue element including an operation code, a memory address specifying location in a first medium, and a page number field specifying a location in a second medium; and setting the transfer-status indication in the associated queue element to an active-not-in-process state.

14. A method of transferring data in a computer system as defined in claim 1, the method further comprising:

controlling a plurality of states for the transfer-status indication in the queue element after the queue element is associated with the start instruction.

15. A method of as defined in claim 1, the method further comprising:

accessing a queue element indicating an active-not-in-process state in its transfer-status indication by one of a plurality of PT processors when a queue empty indication does not exist in the queue header, posting the queue empty indication in the queue header when a queue manager program does not find any queue element in the queuing means having an active-not-in-process state to indicate to the PT processors that no work item currently exists in the queue; and writing a completion state indication in a queue element by the queue manager upon receiving a signal from a PT processor of completion of a page transfer request.

* * * * *